Dec. 8, 1931.  A. W. SHARP  1,835,345
LAMINATED RATCHET PINION
Filed Feb. 13, 1930
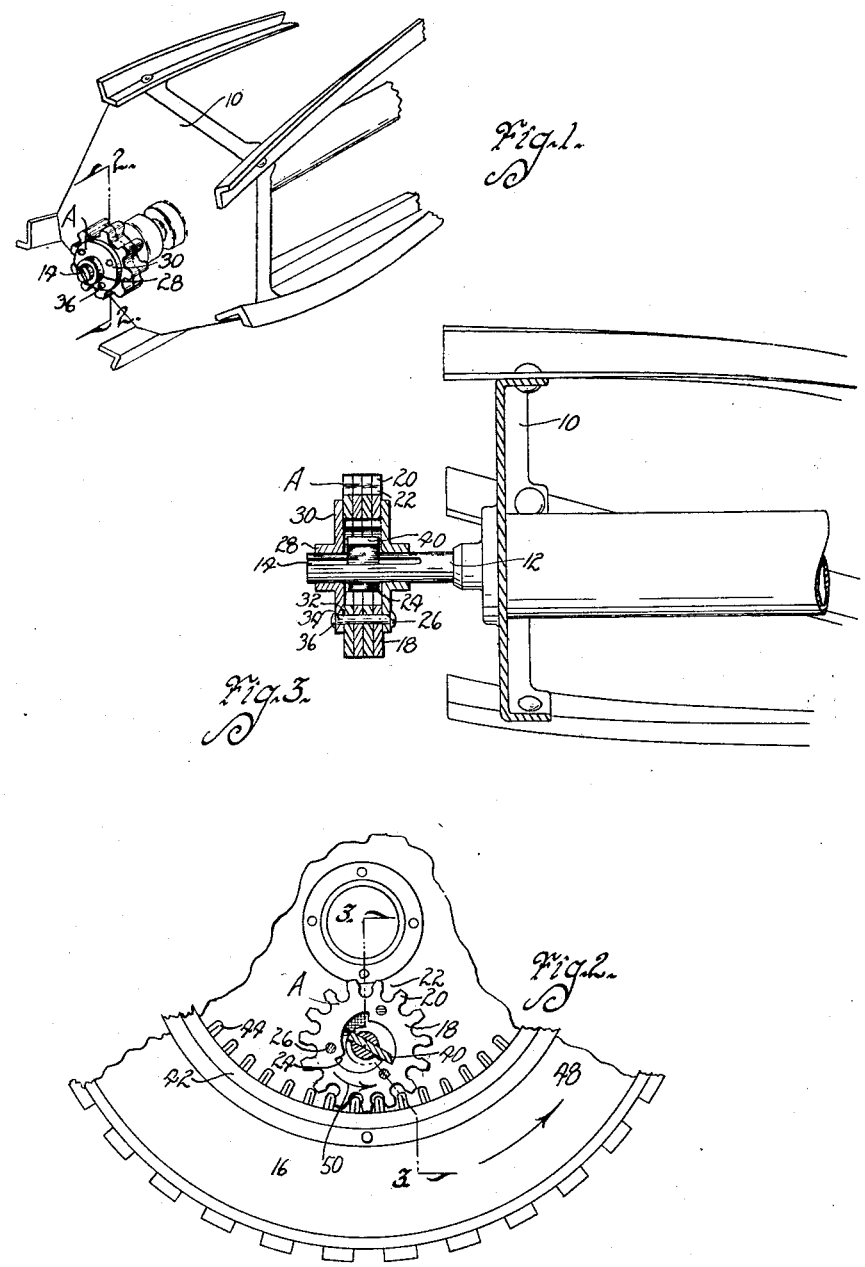
Inventor
Allen W. Sharp
by Bair, Freeman & Sinclair
Attorneys
Witness
Edw. Seeley Patented Dec. 8, 1931

1,835,345

UNITED STATES PATENT OFFICE

ALLEN W. SHARP, OF OTTUMWA, IOWA, ASSIGNOR TO JOHNSTON PRESSED GEAR CO., OF OTTUMWA, IOWA, A CORPORATION OF IOWA

LAMINATED RATCHET PINION

Application filed February 13, 1930. Serial No. 428,097.

My present invention has to do with a laminated pinion of the kind having an internal ratchet gear and employed for instance for driving the reel of a lawn mower.

It is the object of my present invention to provide such a pinion which can be manufactured by the die stamping process and thus produced with great economy of manufacturing cost.

It is a further purpose to provide a laminated pinion of the type mentioned so constructed that it may be made of stampings and yet will have great strength.

Still another purpose is to provide such a pinion in which the drive from the pinion to the pawl and the driven shaft is in direct radial lines, so that any tendency to twist and bind the pinion on the shaft is avoided.

Another purpose is to provide such a pinion having hub flanges arranged on opposite sides and laminated toothed rings between them, constructed and assembled in such manner that the same pinion may serve as a right or a left.

With these and other objects in view, my invention consists in the construction, arrangement and combination of the various parts of my laminated ratchet pinion, whereby the objects contemplated are attained, as hereinafter more fully set forth, pointed out in my claims, and illustrated in the accompanying drawings, in which:

Figure 1 is a perspective view of one end of a lawn mower reel equipped with a laminated ratchet pinion embodying my invention.

Figure 2 is a detail, sectional view taken on the line 2—2 of Figure 1 and including parts of certain elements not shown in Figure 1; and Figure 3 is a detail, sectional view taken on the line 3—3 of Figure 2.

It is my purpose to provide a structure for a pressed steel pinion having peripheral teeth and internal ratchet teeth, which pinion can be manufactured by the die stamping method.

In the drawings herewith, I have used the reference numeral 10 to indicate generally the reel of a lawn mower having the shaft 12 provided with the longitudinal slot 14.

I have illustrated my invention as embodied in a pinion A for driving the shaft 12 and the reel 10 from a traction wheel 16 (Figure 2) of the mower.

The laminated pinion consists of a plurality of gear rings or elements 18, preferably exactly alike, having the peripheral teeth 20 alternating with the notches 22.

In the interior of the ring 18, it is provided with a series of ratchet teeth 24, as illustrated in Figure 2.

The body of the ring 18 is provided with a series of holes 26.

A plurality of the rings 18 are placed in laminated position as shown in Figure 3 with their teeth 20 in exact registration.

At each end of the gear is a hub 28 having the annular flange 30. The laminated rings 18 are arranged between the flanges 30. The flanges 30 are provided with holes 32, which in the completed structure are arranged in registration with the respective holes 26.

The pins 34 are extended through the registering holes 32 and 26 and are held in position by means of heads 36 or the like.

It will be understood that in assembling the pinion, the flat plate-like pawl 40 is assembled on the interior of the pinion, being loosely received. When the pinion is slipped upon the shaft 12, the pawl 40 slides into the slot 14.

In the particular illustration shown, the lower wheel 16 is illustrated as provided with the internal gear 42, having the inwardly projecting pressed-steel teeth 44 (Figure 2) meshing with the teeth of the pinion A.

In the practical operation of my improved laminated pinion, the pinion A is rotated when the wheel 16 is rotated. The direction of rotation of the pinion A depends upon the direction of rotation of the wheel 16. If the wheel 16 is traveling forwardly for running the mower in the direction indicated by the arrow 48 in Figure 2, the pinion will be operated in the direction indicated by the arrow 50 thereon, causing the ratchet teeth 24 to engage with the pawl 40 and by operating it to rotate the shaft 12 and the reel 10.

Should the wheel 16 be operated in the opposite direction, the pinion A will be operated in the opposite direction, and the ratchet teeth 24 are so arranged that when the pinion does so operate in the opposite direction, the pawl 40 will simply slide over the teeth 24 in the ordinary way.

A gear of this kind has several advantages some of which have already been mentioned. It can be made of pressed steel by an economical process of manufacture. The labor of stamping the toothed rings 18 is substantially less than the labor of milling out the peripheral notches and the internal ratchet notches.

With the two hub members 28 and their flanges 30, a pinion of great strength is produced.

By making the gear in the laminated form, combined with the two flanged hubs 28, there is provided the proper opening on the interior of the gear for the pawl and at the same time a proper bearing on both sides of the gear. Consequently the drive from the gear through the pawl to the shaft on which the gear is mounted is in direct radial lines and any tendency of the pinion to twist or bind on the shaft is eliminated.

When a gear of this internal ratchet toothed-type is milled out, it is obvious that it can have a bearing only on one side, and that the ratchet portion of the pinion simply overhangs the drive shaft.

The stamped toothed rings 18 may be readily punched out, arranged in their laminated order and secured to the flanges of the hubs 28 quickly, simply and easily. Both the external and internal teeth may thus be produced accurately and easily at a modest expense, which can not be equaled in cut gears.

By building up the gears, it is possible to provide the hubs on both dies and then any completed gear will serve for either a right or a left, and there is not the necessity for making rights and lefts as is true with the cut gears having the internal tooth arrangement.

Some changes may be made in the details of the structure and arrangement of the parts of my improved laminated pinion without departing from the real spirit and purpose of my invention, and it is my intention to cover by my claims any modified forms of structure or use of mechanical equivalents, which may be reasonably included within their scope.

I claim as my invention:

1. A plurality of pinion rings having registering external teeth and having internal teeth, a hub on each side of said rings having an annular flange overlapping the rings, said hubs having central openings which are smaller in diameter than the interior diameters of said pinion rings for thereby forming closed pawl housings between the internal teeth of the pinion rings, the flanges of said hubs and a shaft fitting through the central openings of said hubs and means for securely locking said flanges and rings together.

2. A laminated pinion of the kind described, comprising a pair of spaced hub members having annular flanges, pinion rings arranged in laminated relation between said flanges having peripheral teeth projecting radially beyond the flanges and having internal teeth, means for fastening the flanges and rings together to form a unitary pinion structure, and a flat plate-like pawl received on the interior of said pinion and completely housed by the pinion rings, hub members and a shaft fitting through the hub members.

3. In a laminated pinion of the kind described, a plurality of pinion rings arranged in laminated relation, said pinion rings having registering peripheral teeth, aligned hub elements arranged in spaced relation to receive a shaft of less diameter than the internal diameters of said pinion rings and having annular flanges receiving said pinion rings between them and overlapping said rings, rigidly secured thereto and to each other to form a closed housing between said rings, the flanges of said hubs and a shaft in said hubs and means in said housing for operatively connecting said pinion rings with said shaft.

4. A plurality of pinion rings having registering external teeth and having an odd number of internal ratchet teeth, a hub on each side of said rings having an annular flange overlapping the rings, means for securely locking said flanges and rings together and a shaft through said hubs having a slot therein, a pawl slidable through said shaft and having ends coacting with said ratchet teeth.

5. A pinion ring having external teeth, a hub on each side of said ring having an annular flange overlapping the ring, said hubs having central openings which are smaller in diameter than the interior diameters of said pinion ring for thereby forming a completely closed pawl housing bounded by the interior diameter of the pinion ring, the flanges of said hubs and a shaft fitting through their central openings.

ALLEN W. SHARP.